(12) United States Patent
Theile et al.

(10) Patent No.: US 10,344,738 B2
(45) Date of Patent: Jul. 9, 2019

(54) ROTOR BLADE ELEMENT FOR A WIND TURBINE, ROTOR BLADE, AND A PRODUCTION PROCESS THEREFOR AND WIND TURBINE WITH ROTOR BLADE

(71) Applicant: Wobben Properties GmbH, Aurich (DE)

(72) Inventors: Benjamin Theile, Oldenburg (DE); Alexander Hoffmann, Emden (DE)

(73) Assignee: Wobben Properties GmbH, Aurich (DE)

( * ) Notice: Subject to any disclaimer, the term of this patent is extended or adjusted under 35 U.S.C. 154(b) by 503 days.

(21) Appl. No.: 14/913,668

(22) PCT Filed: Aug. 1, 2014

(86) PCT No.: PCT/EP2014/066582
§ 371 (c)(1),
(2) Date: Feb. 22, 2016

(87) PCT Pub. No.: WO2015/028250
PCT Pub. Date: Mar. 5, 2015

(65) Prior Publication Data
US 2016/0208773 A1 Jul. 21, 2016

(30) Foreign Application Priority Data
Aug. 28, 2013 (DE) .................. 10 2013 217 128

(51) Int. Cl.
*F03D 1/06* (2006.01)
*B32B 25/04* (2006.01)
(Continued)

(52) U.S. Cl.
CPC .......... *F03D 1/0675* (2013.01); *B32B 25/042* (2013.01); *B32B 25/08* (2013.01);
(Continued)

(58) Field of Classification Search
CPC .... Y02P 70/523; Y02E 10/721; Y02E 10/726; F03D 1/00; F03D 1/06; F03D 1/0608;
(Continued)

(56) References Cited

U.S. PATENT DOCUMENTS 7,946,803 B2    5/2011   Wobben
8,506,255 B2    8/2013   Wobben
(Continued)

FOREIGN PATENT DOCUMENTS

CN    102458839 A    5/2012
DE    10319246 A1    12/2004
(Continued)

*Primary Examiner* — Richard A Edgar
(74) *Attorney, Agent, or Firm* — Seed Intellectual Property Law Group LLP (57) ABSTRACT

A rotor blade element, in particular produced by a process according to claim 10, in particular a rotor blade edge for a wind turbine, with a base comprising a fiber material saturated with curable resin and with a surface foil, with, arranged between base and surface foil, a bonding layer. The invention proposes that the surface foil comprises polyethylene with ultra-high molecular weight and that the bonding layer comprises a first rubber layer and a second rubber layer, where the first rubber layer is allocated to the surface foil and the second rubber layer is allocated to the base.

18 Claims, 4 Drawing Sheets

(51) Int. Cl.
  *B32B 25/08* (2006.01)
  *B32B 25/10* (2006.01)
  *B32B 25/14* (2006.01)
  *B32B 25/16* (2006.01)
  *B32B 27/32* (2006.01)
  *B32B 37/18* (2006.01)

(52) U.S. Cl.
  CPC .............. *B32B 25/10* (2013.01); *B32B 25/14* (2013.01); *B32B 25/16* (2013.01); *B32B 27/32* (2013.01); *B32B 37/182* (2013.01); *B32B 2250/24* (2013.01); *B32B 2260/021* (2013.01); *B32B 2260/048* (2013.01); *B32B 2262/101* (2013.01); *B32B 2307/554* (2013.01); *B32B 2307/558* (2013.01); *B32B 2307/714* (2013.01); *B32B 2307/734* (2013.01); *B32B 2603/00* (2013.01); *Y02E 10/721* (2013.01); *Y02E 10/726* (2013.01); *Y02P 70/523* (2015.11)

(58) Field of Classification Search
  CPC ...... F03D 1/0633; F03D 1/0641; F03D 1/065; F03D 1/0675; F03D 1/0683; B32B 25/042; B32B 25/08; B32B 25/10; B32B 25/14; B32B 25/16; B32B 27/32; B32B 37/182; B32B 2250/24; B32B 2260/021; B32B 2260/048; B32B 2262/101; B32B 2307/554; B32B 2603/00
  See application file for complete search history.

(56) References Cited

U.S. PATENT DOCUMENTS

| 8,585,370 | B2 | 11/2013 | Muschke et al. |
| 9,067,341 | B2 | 6/2015 | Wehner |
| 9,085,990 | B2 | 7/2015 | Lindner et al. |
| 2010/0032948 | A1 | 2/2010 | Bevirt |
| 2011/0061321 | A1 | 3/2011 | Phuly |
| 2012/0034833 | A1* | 2/2012 | Schaube .............. A63C 11/227 442/172 |
| 2012/0047830 | A1 | 3/2012 | Phuly |

FOREIGN PATENT DOCUMENTS

| DE | 10344379 A1 | 4/2005 |
| DE | 102004007487 A1 | 9/2005 |
| DE | 102009002501 A1 | 10/2010 |
| DE | 102011004723 A1 | 8/2012 |
| EP | 2416950 B1 | 9/2013 |
| JP | 2009057713 A | 3/2009 |
| JP | 2011017245 A | 1/2011 |
| RU | 2099188 C1 | 12/1997 |
| RU | 2011147102 A | 5/2013 |
| SU | 127911 A1 | 11/1959 |
| UA | 28035 U | 11/2007 |
| WO | 2010118860 A2 | 4/2010 |
| WO | 2013045087 A1 | 4/2013 |

* cited by examiner

ROTOR BLADE ELEMENT FOR A WIND TURBINE, ROTOR BLADE, AND A PRODUCTION PROCESS THEREFOR AND WIND TURBINE WITH ROTOR BLADE

BACKGROUND

Technical Field

The present invention relates to a rotor blade element for a wind turbine, a rotor blade, and a production process for the rotor blade element or the rotor blade. The invention further relates to a wind turbine.

Description of the Related Art

Rotor blades for wind turbines have been known for a long time and are described by way of example in DE 10 2004 007 487 A1 and DE 103 19 246 A1. During operation they are exposed to wind pressure, erosion, temperature variations, UV irradiation and high loads due to precipitation. With blade tip velocities up to 300 km/h, sand grains, salt particles, insects or other objects carried by the air have an abrasive effect. This wears the surface of rotor blades, in particular in the frontal edge region. At these locations there is ablation of the rotor surface and therefore a loss of aerodynamic properties and stability.

However, at the same time the rotor blades are intended to have minimum weight, in order to minimize the bending loads acting on any scarring that may be present on the rotor blade, and on the attendant bearings and the tower of the wind turbine. It has proved to be advantageous to produce rotor blades from individual elements and to bond these elements to one another to give a hollow-chamber rotor blade. Rotor blade elements usually used are a rotor blade pressure side, a rotor blade suction side and one or more bonding fillets for the bonding and stiffening of the rotor blade pressure side and rotor blade suction side. Success has likewise been achieved with one-piece production of the rotor blade pressure side and rotor blade suction side and arrangement of fillets during this production process at the locations where these are required.

Rotor blades and rotor blade elements are usually produced in a molding process in which fiber materials and/or core materials, in particular balsa wood, are inserted into a rotor blade element mold and are treated with a hardening resin to form a composite material that can withstand load. Production of rotor blades or rotor blade elements frequently uses epoxy resins as resin. These have good suitability for the construction of the base of a rotor blade or rotor blade element made of fiber material and curable resin. A person skilled in the art understands the expression "curable resin" in the context of the present invention as stating a fundamental property of the resin rather than as a property that is actually still present in a material within the rotor blade or rotor blade element.

In order to protect the rotor blades or the rotor blade elements from weathering effects and in particular from erosion, attempts have been made to use a surface layer by using a gelcoat process as described in DE 10 3 44 379 A1. This has the disadvantage that in that type of process it is necessary to provide an appropriate processing time sufficient to complete reaction of the gelcoat mixture to an extent that allows it to be covered with fiber material. This leads to undesired slowing of the production process for a rotor blade or rotor blade element. With the gelcoat process it is moreover not possible to interrupt the production of a rotor blade element or rotor blade as desired in order to permit bonding between gelcoat surface layer and infusion resin. Attempts have also been made to adhesive-bond surface foils onto the rotor blade or the rotor blade element, or to secure these by other means subsequently on the rotor blade or rotor blade element, sometimes releasably. By way of example, polyurethane foils are adhesive-bonded onto rotor blades. Another possibility from the prior art according to DE 10 2009 002 501 A1 is the production of a crosslinked composite made of surface foil and infusion resin. Again, this process is in particular possible with polyurethane foils. Polyurethane has high abrasion resistance. However, it is desirable to improve the abrasion resistance of rotor blades or rotor blade elements.

The priority application involved search of the following prior art by the German Patent and Trademark Office: DE 10 2011 004 723 A1, US 2010/0032948 A1, EP 2 416 950 B1, WO 2013/045087 A1.

BRIEF SUMMARY

Embodiments are directed to providing a rotor blade element, a rotor blade and a wind turbine which are improved over the prior art. The intention is at least to propose an alternative solution to a solution known in the prior art.

A rotor blade element for a wind turbine according to an embodiment of the invention has a base comprising a fiber material saturated with curable resin, and a surface foil and, arranged between base and surface foil, a bonding layer. The surface foil here comprises polyethylene with ultra-high molecular weight (UHMWPE) and the bonding layer comprises a first rubber layer allocated to the surface foil and a second rubber layer allocated to the base.

The invention is based on the discovery that the use of surface foils comprising UHMWPE can markedly improve the abrasion resistance of rotor blade elements. The invention moreover includes the discovery that by way of a bonding layer comprising two rubber layers it is advantageously possible to achieve the application and long-lasting bonding of UHMWPE on a base of a rotor blade element made of fiber material and made of curable resin, in particular epoxy resin. UHMWPE features very good resistance to wear and to abrasion even when exposed to abrasive media, its abrasion resistance being six times higher than that of polyurethane. UHMWPE also has excellent chemical stability, and a low coefficient of friction, exceptional dimensional stability, and high impact resistance even at low temperatures. Because of these properties, UHMWPE is of particular interest for use as surface foil for protection from erosion, but bonding of UHMWPE with conventional adhesives gives very poor results. In particular, epoxy resins are not suitable for direct bonding to polyethylene, in particular UHMWPE. However, the invention is based on the discovery that it is possible, by using a bonding layer made of two rubber layers, to achieve application of UHMWPE foils even on rotor blade elements or rotor blades based on epoxy resin, and thus to improve the abrasion resistance of the rotor blade elements or rotor blades.

For the purposes of this specification, vulcanization is any crosslinking reaction of the polymers present in the first and/or the second vulcanized rubber layer. For the purpose of this specification a vulcanized rubber is an unvulcanized rubber that has undergone vulcanization, i.e., crosslinking, or in other words an unvulcanized rubber that has undergone polymerization.

The concept of the invention is useful in general terms for a rotor blade element, irrespective of any production process. However, a rotor blade element that has proved to be particularly advantageously successful is one produced by a production process according to claim 10. However, it is also possible in principle that production processes other than the claimed production process are used. A production process in accordance with one embodiment of the invention comprises the following steps:

a) provision of a surface foil comprising UHMWPE b) production of a composite via application of an unvulcanized rubber layer on one side of the surface foil c) vulcanization of the unvulcanized rubber layer to give a first vulcanized rubber layer d) provision of a fiber material e) production of a base via saturation of the fiber material by a curable resin f) curing of the curable resin g) application of a second unvulcanized rubber layer on the base and/or on the composite h) application of composite to the base in such a way that the location of the second unvulcanized rubber layer is between base and composite i) vulcanization of the second unvulcanized rubber layer to give a second vulcanized rubber layer.

Embodiments of the rotor blade element of the invention are described below.

It is preferable that the rotor blade element has been produced by a production process in accordance with the concept of the invention. It is preferable that the first and the second rubber layers have respectively been vulcanized in their own vulcanization step, and that these therefore have a different vulcanization history.

It is preferable that the first rubber layer has a different, in particular a higher, degree of vulcanization than the degree of vulcanization of the second rubber layer allocated to the base. The different degrees of vulcanization here serve to render the rubber layers ideally appropriate to the components allocated to the said layers. In another embodiment, the first rubber has the same degree of vulcanization as the second rubber layer. In this embodiment, the first and the second rubber layer have been crosslinked in an ideal manner with one another.

In a method that has proved to be particularly advantageously successful, the first rubber layer has been bonded directly to the surface foil and the second rubber layer has been bonded directly to the base. In another embodiment, the bonding layer can comprise another bonding layer between the first rubber layer and the second rubber layer. This bonding layer can advantageously serve for improved bonding of the first rubber layer to the second rubber layer. However, the first rubber layer can also have been bonded directly to the second rubber layer.

It is preferable that the first and/or the second rubber layer comprises ethylene-propylene-diene rubber (EPDM). EPDM has good suitability for bonding to UHMWPE, and also has excellent resistance to heat, to ozone and to UV. EPDM is moreover flexible and resilient, and therefore bonding of the EPDM to the UHMWPE can combine the robustness of the UHMWPE with the damping properties of the EPDM. Even at low temperatures, EPDM has high flexibility. In another embodiment, the first and/or the second rubber layer comprises additional UV stabilizers.

It is preferable that the curable resin is a reactive resin, in particular an epoxy resin. Epoxy resins have particularly good suitability for use in fiber-composite materials. Glass fibers and/or carbon fibers are a preferred fiber material. The rotor blade element can also comprise, alongside the fiber material, other core materials as structural elements, for example birch-wood elements and/or balsa-wood elements and/or foam elements. An advantage of these rotor blade elements or rotor blades comprising fiber materials is stability with low weight. Another advantage is their good moldability, before the resin has hardened.

It is preferable that bonding of the first rubber layer to the surface foil occurs via mechanical adhesion and bonding of the second rubber layer to the base occurs via crosslinking reactions. In preferred embodiments, the rotor blade element is a fillet, an external rotor blade shell and parts thereof, in particular a half-shell for the pressure side or suction side, a frontal rotor blade edge, a rear rotor blade edge, a rotor blade tip or a leading rotor blade edge.

For wind turbines it is particularly advantageous that UHMWPE foils can be colored in a way that permits, for example, application of the signal markings that are required for aviation safety reasons. The colors of colored surface foils are preferably one or more of the following standard colors: Agate grey RAL 7038, Traffic red RAL 3020, Traffic orange RAL 2009, Traffic white RAL 9016 and Flame red RAL 3000.

It is moreover advantageous to use UHMWPE foils which have also been UV-stabilized. These foils have improved stability under outdoor conditions.

A production process according to the concept of the invention shares the advantages of the device described above.

In particular, it is advantageous for the purposes of the production process that the second rubber layer is applied on the composite and the composite with the second rubber layer is then applied to the base. This permits good bonding of composite and base. However, it can also be advantageous to apply the second rubber layer only on the base, or to apply material of the second rubber layer not only on the base but also on the composite.

It is preferable that the vulcanization of the first rubber layer takes place at higher temperatures and/or higher pressures than the vulcanization of the second rubber layer. A process of this type in particular takes account of the thermal stability of epoxy resin. In this way it is possible when completing the vulcanization of the second rubber layer to vulcanize this by way of example only partially at low temperatures and/or low pressures, thereby nevertheless obtaining good bonding to the first rubber layer and to the resin of the base, while at the same time not subjecting the resin to excessive thermal stress. However, the scope also includes vulcanization of the second rubber layer up to the degree of vulcanization of the first rubber layer, for example with longer vulcanization times at lower temperatures than in the vulcanization of the first rubber layer.

It is moreover advantageous that the curing of the resin and the vulcanization of the second rubber layer take place in one step. If the two processes are combined in one step, the second rubber layer and the resin can achieve better crosslinking.

In particular, an advantageous process is one in which the bonding of the first rubber layer to the surface foil takes place by way of mechanical adhesion, and in which the bonding of the second rubber layer to the base takes place by way of crosslinking reactions.

Embodiments of the invention will now be described below with reference to the drawing in comparison with the prior art, which is to some extent likewise described. The drawing is not necessarily intended to show the embodiments to scale, instead being diagrammatic and/or slightly distorted where this serves illustrative purposes. Reference is made to the relevant prior art for information supplementary to the teaching directly discernible from the drawing. A factor requiring consideration here is that many different modifications and changes relating to the form and the detail of an embodiment can be undertaken without deviating from the general concept of the invention. The inventive features disclosed in the description, in the drawing and in the claims can be essential for the embodiment of the invention either individually or else in any desired combination. The scope of the invention also includes all combinations of at least two of the features disclosed in the description, in the drawing and/or in the claims.

The general concept of the invention is not restricted to the precise form or the detail of the preferred embodiment shown and described below, or restricted to any subject matter that would be limited in comparison with the subject matter claimed in the claims. Where ranges of dimensions are specified, the intention is that values lying within the limits mentioned also be disclosed as limiting values and be available for use as desired and available to be claimed as desired. Other advantages, features and details of the invention will be apparent from the following description of the preferred embodiments, and also with reference to the drawing, in which:

DETAILED DESCRIPTION

Figure 1:
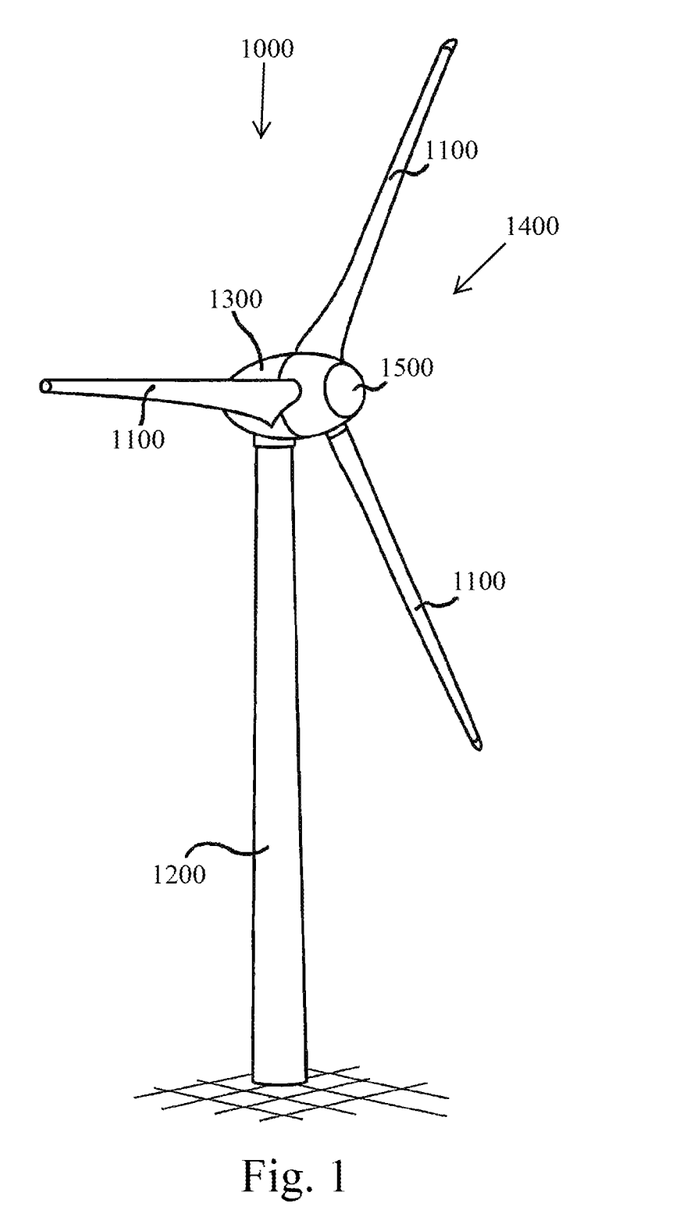
FIG. 1 is a diagram of a wind turbine with rotor blades according to the invention.

FIG. 1 shows a wind turbine 1000 with a tower 1200 and with a nacelle 1300. Arranged on the nacelle 1300 there is a rotor 1400 with three rotor blades 1100 and with a spinner 1500. In operation, the wind rotates the rotor 1400, which thus drives a generator in the nacelle 1300. The rotor blades 1100 of the wind turbine 1000 have a base made of fiber material saturated with curable resin and have locally been coated with a surface foil made of UHMWPE, and between the surface foil and the base there is a bonding layer which in turn comprises a first and a second rubber layer. The degree of vulcanization of the first rubber layer here is different from that of the second rubber layer. This structure is illustrated in more detail with reference to the following figures.

Figure 2:
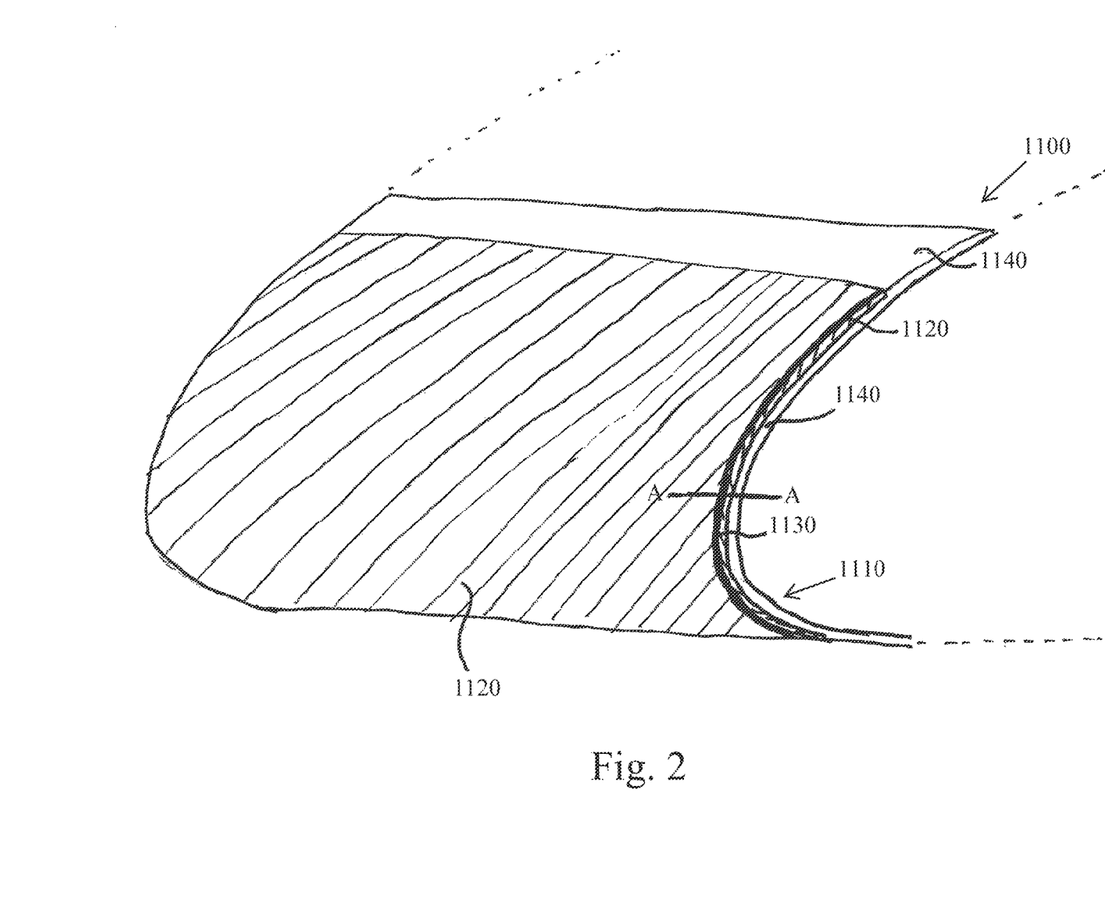
FIG. 2 is a diagram of an embodiment of a leading rotor blade edge as rotor blade element according to the invention.

FIG. 2 shows a rotor blade element 1110 of the rotor blade 1100, namely the leading rotor blade edge. The leading rotor blade edge 1110 has a surface foil 1120. In this embodiment the said foil is composed of polyethylene with ultra-high molecular weight (UHMWPE). The surface foil 1120 has been bonded by way of a bonding layer 1130 to the base 1140 of the rotor blade element 1140. The base 1140 of the rotor blade element here is composed of a fiber material saturated with curable resin. The fiber material in the embodiment is glass-fiber-reinforced plastic (GRP), and the curable resin is an epoxy resin. The bonding layer 1130 comprises a first rubber layer and a second rubber layer, these having different degrees of vulcanization. The bonding of the surface foil 1120 to the base 1140 by means of a resilient bonding layer with a plurality of rubber layers firstly allows UHMWPE to be joined to epoxy resin. Secondly, the bonding layer has damping properties, and this is particularly advantageous when the surface foil and the rotor base are exposed to loads. The surface foil 1120 made of UHMWPE is particularly resistant to the abrasive loads that arise during the operation of wind turbines, in particular at the rotor edges. The rubber used in this embodiment in the first and second rubber layer is vulcanized EPDM rubber.

Figure 3:
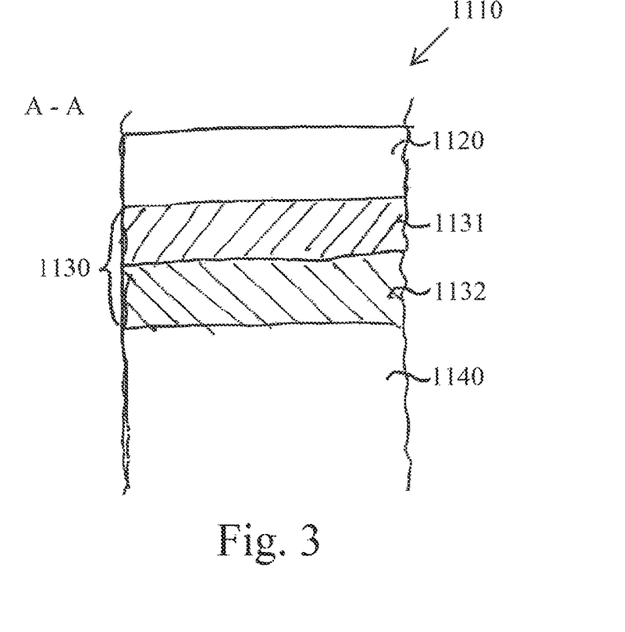
FIG. 3 is a diagram of a detail of the rotor blade element from FIG. 2.

FIG. 3 shows a detail of the rotor blade element 1110. At this location in the rotor blade element 1110 the rotor blade element 1110 has the following layer structure: firstly a base 1140, on which is the bonding layer 1130 composed of the first rubber layer 1131 and of the second rubber layer 1132. The arrangement here has the second rubber layer 1132 directly on the base 1140 and bonded thereto preferably by way of crosslinking reactions. The arrangement has the first rubber layer 1131 on the second rubber layer 1132. In the embodiment shown, the first rubber layer 1131 has a higher degree of vulcanization than the second rubber layer 1132. The arrangement has the surface foil 1120 made of UHMWPE directly on the first rubber layer 1131. The surface foil 1120 adheres to the first rubber layer 1131 by way of mechanical adhesion. The layer structure shown permits robust bonding of UHMWPE to the base of a rotor blade or of a rotor blade element made of epoxy-resin-saturated fiber material, and at the same time combines the damping properties of the rubber layers of the bonding layer with the abrasion resistance, and thus the protection from erosion, provided by the UHMWPE foil.

Figure 4:
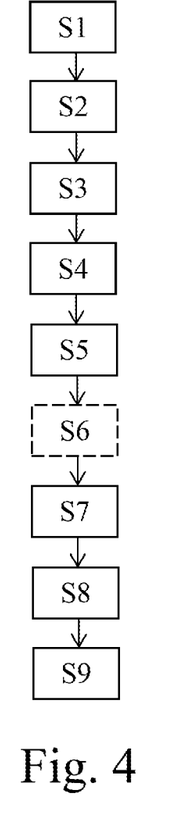
FIG. 4 is a diagram of an embodiment of a production process according to the concept of the invention.

FIG. 4 is a diagram of a production process for a rotor blade according to an embodiment of the invention. In step S1 a surface foil which comprises UHMWPE is provided. In step S2 a composite is produced from the surface foil and from an unvulcanized rubber layer, in that the unvulcanized rubber layer is applied to one side of the surface foil. In one embodiment of the process, the unvulcanized rubber layer can be applied to the surface foil by use of rolls. However, a spreading process can also be used to apply the unvulcanized rubber. In step S3 the unvulcanized rubber layer is vulcanized to give a first vulcanized rubber layer. In one preferred embodiment the unvulcanized rubber is EPDM. The vulcanization can by way of example be achieved by way of sulphur vulcanization, or else, in particular in the case of EPDM, by using peroxides. Suitable vulcanization temperatures are from 100° C. to 180° C., in particular from 140° C. to 150° C. Suitable pressures for the production of the composite made of UHMWPE foil and EPDM are about 8 bar.

In step S4 a fiber material is provided for a base of the rotor blade element. It is preferable that the fiber material is a glass-fiber-reinforced plastic. In step S5 the base is then produced via saturation of the fiber material with a curable resin, preferably epoxy resin. In step S6 the curable resin can then optionally immediately be cured. However, the curing of the resin can also take place later in the process. In step S7 a second rubber layer is applied. The material of the second rubber layer here is either applied on the base or else on the composite or, in another embodiment, partially on the base and partially on the composite. In step S8 the composite is applied to the base in such a way that the second rubber layer is between base and composite. In step S9 the second rubber layer is vulcanized to give a second rubber layer, thus creating durable bonding of the base to the composite, and therefore to the surface foil. The second rubber layer is advantageously vulcanized at 50° C. and 2 bar. The second rubber layer, like the first rubber layer, advantageously comprises EPDM. EPDM has good suitability not only for bonding to UHMWPE but also for bonding to epoxy resin. The curing of the curable resin can also take place simultaneously with the vulcanization of the second rubber layer to give the second vulcanized rubber layer.

The invention claimed is:

1. A process for producing a rotor blade or rotor blade element, the process comprising:
    bonding a first unvulcanized rubber layer on a first side of a surface foil to form a composite, the surface foil including polyethylene with ultra-high molecular weight;
    vulcanizing the first unvulcanized rubber layer to provide a first vulcanized rubber layer;
    forming a base by saturating a fiber material with a curable resin;
    curing the curable resin;
    bonding a second unvulcanized rubber layer on at least one of the base and the composite;
    bonding the composite to the base in such a way that the location of the second unvulcanized rubber layer is between the base and the composite; and p1 vulcanizing the second unvulcanized rubber layer to give a second vulcanized rubber layer, wherein vulcanizing the first unvulcanized rubber layer takes place at higher temperatures, higher pressures or both than vulcanizing the second unvulcanized rubber layer.

2. The process according to claim 1, wherein curing the resin and vulcanizing the second unvulcanized rubber layer occur in a single step.

3. The process according to claim 1, wherein bonding the first unvulcanized rubber layer on the first side of the surface foil takes place by way of mechanical adhesion, and wherein bonding the second unvulcanized rubber layer to the at least one of the base and the composite takes place by way of crosslinking.

4. A rotor blade element made according to the process of claim 1, the rotor blade element comprising:
    a base including a fiber material saturated with curable resin;
    a surface foil including ultra-high molecular weight polyethylene over the base; and
    a bonding layer arranged between the base and the surface foil, the bonding layer including a first vulcanized rubber layer and a second vulcanized rubber layer, wherein the first vulcanized rubber layer is bonded to the surface foil and the second vulcanized rubber layer is bonded to the base,
    wherein a degree of vulcanization of the first vulcanized rubber layer is higher than a degree of vulcanization of the second vulcanized rubber layer.

5. A rotor blade comprising a rotor blade element according to claim 4.

6. A wind turbine comprising the rotor blade according to claim 5.

7. A process for producing a rotor blade or rotor blade element, the process comprising:
    bonding a first unvulcanized rubber layer on a first side of a surface foil to form a composite, the surface foil including polyethylene with ultra-high molecular weight, wherein bonding the first unvulcanized rubber layer on the first side of the surface foil takes place by way of mechanical adhesion;
    vulcanizing the first unvulcanized rubber layer to provide a first vulcanized rubber layer;
    forming a base by saturating a fiber material with a curable resin;
    curing the curable resin;
    bonding a second unvulcanized rubber layer on at least one of the base and the composite, wherein bonding the second unvulcanized rubber layer to the at least one of the base and the composite takes place by way of crosslinking;
    bonding the composite to the base in such a way that the location of the second unvulcanized rubber layer is between the base and the composite; and
    vulcanizing the second unvulcanized rubber layer to give a second vulcanized rubber layer.

8. The process according to claim 7, wherein curing the resin and vulcanizing the second unvulcanized rubber layer occur in a single step.

9. The process according to claim 7, wherein vulcanizing the first unvulcanized rubber layer takes place at higher temperatures and higher pressures than vulcanizing the second unvulcanized rubber layer.

10. A rotor blade element made according to the process of claim 7, the rotor blade element comprising:
    a base including a fiber material saturated with curable resin;
    a surface foil including ultra-high molecular weight polyethylene over the base; and
    a bonding layer arranged between the base and the surface foil, the bonding layer including a first vulcanized rubber layer and a second vulcanized rubber layer, wherein the first vulcanized rubber layer is bonded to the surface foil and the second vulcanized rubber layer is bonded to the base,
    wherein a degree of vulcanization of the first vulcanized rubber layer is higher than a degree of vulcanization of the second vulcanized rubber layer.

11. The rotor blade element according to claim 10, wherein the first vulcanized rubber layer is bonded directly to the surface foil and the second vulcanized rubber layer is bonded directly to the base.

12. The rotor blade element according to claim 10, wherein at least one of the first and second vulcanized rubber layers include ethylene-propylene-diene rubber.

13. The rotor blade element according to claim 10, wherein the curable resin is a reactive resin.

14. The rotor blade element according to claim 13, wherein the reactive resin is an epoxy resin.

15. The rotor blade element according to claim 10, wherein the rotor blade element is selected from a group consisting of:
    a fillet,
    an external rotor blade shell,
    a half-shell for a pressure side or for a suction side,
    a rear rotor blade edge,
    a rotor blade tip, and
    a leading rotor blade edge.

16. A rotor blade comprising a rotor blade element according to claim 10.

17. A wind turbine comprising a rotor blade including a rotor blade element according to claim 10.

18. The rotor blade element according to claim 10, wherein the rotor blade element is a rotor blade edge of a rotor blade for a wind turbine.

* * * * *

UNITED STATES PATENT AND TRADEMARK OFFICE
CERTIFICATE OF CORRECTION

PATENT NO. : 10,344,738 B2  
APPLICATION NO. : 14/913668  
DATED : July 9, 2019  
INVENTOR(S) : Benjamin Theile et al.

Page 1 of 1

It is certified that error appears in the above-identified patent and that said Letters Patent is hereby corrected as shown below:

In the Claims

Column 7, Line 20:
"between the base and the composite; and p1 vulcanizing" should read -- between the base and the composite; and vulcanizing --

Signed and Sealed this
Thirtieth Day of June, 2020

Andrei Iancu
*Director of the United States Patent and Trademark Office*